Patented Apr. 28, 1942

2,281,078

UNITED STATES PATENT OFFICE 2,281,078

PALE ROSIN AND PROCESS OF PRODUCING THE SAME

Robert E. Price and Ismond E. Knapp, Picayune, Miss., assignors to Crosby Naval Stores, Incorporated, Picayune, Miss., a corporation of Mississippi No Drawing. Application July 12, 1938, Serial No. 218,880

14 Claims. (Cl. 260—107)

The present invention relates to the purification of rosins, and more particularly to an improved process for purifying wood rosin and low grade gum rosins to produce a pale rosin having certain desirable characteristics, primarily having a relatively high positive optical rotation.

As is well known, the marketability and value of rosins is dependent almost entirely upon the purity thereof and, in the case of wood rosin, it is sold to the trade in various grades depending upon color, clarity and transparency.

A series of color standards, established by the U. S. Department of Agriculture, is universally used applicable to gum rosins, in which the grades are designated B, D, E, F, G, H, I, K, M, N, WG, WW, and X. For wood rosin, but one standard has been established and that is FF which in the gum standard scale would be between D and E or slightly better, but it is known to purify this FF grade to a much higher one and the gum rosin color scale is employed for convenience of comparison. In carrying out our process we are able to produce a much paler grade than X.

For some uses in the arts, it is imperative that the rosin be of a superior grade (containing a minimum amount of color bodies), particularly where the rosin is to be utilized in the manufacture of soaps, in sizing for white paper and in pale varnishes. It is, therefore, a prime object of our present invention to remove the maximum amount of the color bodies by a highly effective process, employing a minimum amount of time, labor and expense.

Heretofore in this art, many processes have been suggested and employed for the purification and decolorization of rosin. For example, it is known to produce pale wood rosin by various methods, such as vacuum distillation of dark wood rosin, or treatment of a naphtha solution of dark wood rosin with stannic (or other metal) halide, or by contacting the naphtha solution of dark wood rosin with fuller's earth, or with certain selective solvents such as resorcinol, phenol, furfural, liquid sulphur dioxide, ethylene chlorohydrin, and others.

Now we have found that rosin of an extremely high grade may be produced from low grade wood rosin by contacting a solution of the latter, in a light petroleum distillate solvent, such as naphtha, gasoline, petroleum ether, etc., with acid-treated bentonite. Bentonite in and of itself has little if any decolorizing action on rosin solutions. If, however, the bentonite is first treated with a mineral acid, such as hydrochloric or sulphuric acid or a mixture of the two, the bentonite is rendered extremely adsorptive toward said coloring bodies. In fact, we have found that acid-treated bentonite is far superior to fuller's earth or other natural adsorptive clays for this purpose since it appears to possess a higher selectivity for the color bodies present in wood rosin. When these acid-treated bentonites are compared with fuller's earth, either the yield is higher for a given grade of decolorized rosin or a paler grade is obtained with the same yield, or a combination of these effects is obtained, i. e. the acid-treated bentonite may produce both a higher yield and a paler rosin of decolorized rosin than does the fuller's earth under the same conditions of operation. For example, wood rosin of FF grade may be improved to I grade with fuller's earth, whereas the same grade rosin may be raised to WW grade with acid-treated bentonite, the yield being substantially the same in both cases. Not only is this true as a general proposition but some types of acid-treated bentonite give better results than others, as explained in the application hereinbefore mentioned.

In the laboratory, the acid treatment of these bentonites consisted in digesting 1000 grams of the pulverized product with approximately 1330 grams of hydrochloric or sulphuric acid, or a mixture of the two, the strength of which was 22.5%. With these proportions the bentonite, therefore, was treated with 29–30% of its weight of 100% acid. The digestion was continued for three hours on a hot plate at about 95° C. and then the mass was allowed to stand over night. The acid was then washed out by decantation, adding more water, stirring, settling, and decanting, and repeating until most of the excess acid had been washed out. The mass was then filtered through a suction filter, thoroughly washed with more water and the cake then dried in an oven at 125° C. This illustration of method of acid-treating a bentonite is given by way of exemplification only and we do not wish to be limited in this respect. Certain commercial acid-treated bentonites have proved to be highly satisfactory.

In general it may be said that the optical rotation of rosin as it occurs in the wood is decidedly dextro-rotatory or positive. A moderate heat treatment of this rosin if continued for several hours, tends to reduce the rotation from say +15 to +18 down to 0 or thereabouts. This same effect takes place if a naphtha solution of the rosin is contacted with acid-treated bentonite (or fuller's earth) at room temperature or above. Our discovery lies in the fact that if the rosin naphtha solution is treated with the acid-treated bentonite at a low temperature, or in the neighborhood of 2° to 28° C. relative to wood rosin and 2° to 33.5° C. as to gum, the rotation of decolorized rosin is practically as high as that of the original FF wood rosin and higher as to that of the gum rosin with which the treatment started.

Under the usual operating conditions, the pale rosin produced by contacting with fuller's earth or acid-treated bentonite or stannic chloride is strongly laevo-rotary, having a specific optical rotation of approximately −1 to −15. Such rosin shows a very strong tendency to crystallize, not only from solutions in the usual solvents for rosin, but also from itself as it is cooling from the molten state to the solid. Such pale rosin is not satisfactory for certain industrial and commercial uses.

This objectionable tendency of pale wood rosin to crystallize is very greatly reduced if the rosin is dextro-rotatory, that is, if it has a positive optical rotation. It is known to convert laevo-rotatory wood rosin into dextro-rotatory rosin by means of a severe heat treatment, as disclosed in the prior art. This procedure, however, requires expensive equipment and very careful supervision and thus adds materially to the cost of the product. Furthermore, this heat treatment necessarily produces some decomposition of the rosin, as shown by the fact that the heat-treated rosin has a lower acid number than the original.

We have discovered that, by proper control of the time and temperature of contact with acid-treated bentonite, a dark wood rosin grading FF in color and having a specific optical rotation of +14 to +18, can be decolorized to a pale wood rosin, grading from N to X by the color standards established by the U. S. Department of Agriculture, and having a specific optical rotation of +11 to +16. Such a pale rosin has a normal acid number, for example, 167.

To illustrate the effect of time and temperature of contact, the results of a number of experimental batches are shown in the table below. A stock solution was prepared by dissolving FF wood rosin (having a specific optical rotation of +17.5) in petroleum naphtha at a concentration of 20 percent by weight. Portions of this stock solution (each portion containing 50 grams of rosin) were then stirred vigorously with the specified quantity of acid-treated bentonite, the slurry was filtered, and the pale rosin was recovered from the filtrate by steam distillation. Batches P1, P2, P3, and P4 were run in a similar manner in a pilot plant, using 100 gallons of the stock solution.

| No. | Ratio acid-treated bentonite to rosin | Time of contact | Temperature of contact | Grade of rosin produced | Specific optical rotation of rosin produced |
|---|---|---|---|---|---|
| 1 | 1:1 | 1 Hr. | 60° C. | WG | −16.1 |
| 2 | 1:1 | 1 Hr. | 40° C. | WG | −8.3 |
| 3A | 1:1 | 1 Hr. | 28° C. | M | +16.1 |
| 5A | 4:1 | 1 Hr. | 28° C. | X | −25.6 |
| 6A | 4:1 | 1 Hr. | 2° C. | X | +14.1 |
| 6B | 4:1 | 1 Hr. | 3° C. | WW | +15.1 |
| 3B | 1:1 | 1 Hr. | 28° C. | M | +16.1 |
| 7 | 1:1 | 18 Hrs. | 28° C. | K | −17.3 |
| 5B | 4:1 | 60 Min. | 28° C. | X | −25.6 |
| 8 | 4:1 | 5 Min. | 28° C. | X | −2.1 |
| 9 | 4:1 | 1 Min. | 28° C. | X | +12.4 |
| 10 | 2:1 | 60 Min. | 28° C. | N | −5.2 |
| 11 | 2:1 | 1 Min. | 28° C. | N | +16.1 |
| P1 | 3:1 | 90 Min. | 29° C. | WW | −31.0 |
| P2 | 3:1 | 5 Min. | 29° C. | WW | −3.1 |
| P3 | 3:1 | 5 Min. | 17° C. | WW | +5.9 |
| P4 | 3:1 | 5 Min. | 12° C. | WW | +11.6 |

In connection with the above table, it may be noted that run 3A clearly shows the effect of varying the temperature of contact, while its corresponding run 3B compared with run 7 shows the effect of time of contact at a constant temperature. Similarly, run 5A compared with run 6 shows the effect of variation of temperature, while run 5B compared with runs 8 and 9 shows the effect of variation of time of contact.

The following runs were made in the same manner as those described previously on FF wood rosin:

| No. | Original gum rosin grade | Ratio earth rosin | Time of contact | Temperature of contact | Grade produced | Specific rotation | Yield |
|---|---|---|---|---|---|---|---|
| G1 | E | 3/1 | 1 Min. | 33.5° C. | X | +29.0 | |
| G2 | E | 3/1 | 1 Hr. | 33.5° C. | X | +31.8 | |
| G3 | E | 3/1 | 1 Hr. | 2.0° C. | X | +23.8 | |
| G4 | E | 3/1 | 1 Hr. | 63.0° C. | X | +31.8 | 92% |
| | | | | | | −25.9 | 86% |
| G5 | K | 1/1 | 1 Hr. | 31.0° C. | X | +25.4 | |
| G6 | K | 1/1 | 1 Hr. | 63.0° C. | X | +27.9 | 94% |
| G7 | K | 1/1 | 5 Min. | 31.0° C. | X | −25.2 | 86% |
| | | | | | | +27.3 | 94% |

The above results show clearly and unmistakably that:

1. With a fixed time of contact, the lower the temperature of contact, the higher the dextro-rotation of the pale rosin;
2. With a fixed temperature of contact, the shorter the time of contact, the higher the dextro-rotation of the pale rosin.

In other words, higher temperature and/or longer time of contact produces pale rosin having a negative optical rotation, whereas lower temperatures and/or shorter time of contact produces pale rosin having a positive optical rotation. The discovery really constitutes the gist of our invention, and, so far as we know, no similar disclosure has been made heretofore.

It should be pointed out that in no case is the optical rotation of the pale rosin any higher than that of the original FF wood rosin which was subjected to the decolorizing process. It is not possible to start with a dark wood rosin having 0 rotation and produce from it a pale rosin having say +11 rotation.

Apparently the acid-treated bentonite has the power of isomerizing the resin acids, which normally have a positive rotation, to resin acids having a negative rotation. We have discovered that this isomerizing power is checked or inhibited almost completely by effecting the contact for a short time at a relatively low temperature.

Summarizing, in general the process according to this invention involves forming a solution of rosin in a suitable petroleum hydrocarbon solvent, as any light petroleum distillate, such for example as gasoline, petroleum, naphtha or the like, vigorously contacting the solution with acid-treated earth for a short period of time at a moderate or low temperature, forming a slurry, separating the solution and recovering the rosin. The solvent may be re-used and the dark impurities carrying some rosin may be recovered from the used earth.

From the foregoing it will be understood that the high grade rosin resulting from the above preferred process or from the described modifications of the process and which embodies our invention has certain definite characteristics, notably light color, high positive optical rotation and less tendency to crystallize from solutions and from the molten state, which distinguish it from known wood rosins, including those partly purified. Hitherto known wood rosins contain color bodies which are objectionable in the manufacture of high grade rosin soaps and paper sizes and in other industrial uses. The substantial elimination of these color bodies is notable in our rosin.

The term "contacting" as used in the appended claims is intended to mean broadly engagement of the rosin or rosin solution with the purifying medium or adsorbent material and is not intended as a specific limitation to the special so-called "contact" process except in those claims which expressly define the formation of a slurry.

It will be understood that no particular form of apparatus is required for carrying out the process in accordance with our invention. It will further be understood that the details and examples given are illustrative only and that the invention broadly described and claimed is in no way limited thereby.

Having thus described our invention, what we claim as new and desire to secure by Letters Patent is:

1. The process of refining dark colored rosin having a high specific positive optical rotation so as to produce a pale rosin without greatly lowering the positive optical rotation of the rosin which comprises dissolving the rosin in petroleum naphtha to a concentration of 20% by weight, adding a quantity of acid-treated bentonite ranging from a ratio of one to four parts of said bentonite to one part of rosin, agitating the mixture for a time ranging from one minute to one hour at a temperature proportionately less than 28° C., with increasing time, and recovering the pale dextro-rotatory rosin from the mixture.

2. The process of refining dark colored wood rosin having a high specific positive optical rotation so as to produce a pale rosin without greatly lowering the positive optical rotation of the rosin which comprises dissolving the rosin in petroleum naphtha to a concentration of 20% by weight, adding a quantity of acid-treated bentonite ranging from a ratio of one to four parts of said bentonite to one part of rosin, agitating the mixture for a time ranging from one minute to one hour at a temperature ranging from 2° C. to 28° C. in inverse proportion to the range of time.

3. The process of refining dark colored rosin having a high specific positive optical rotation so as to produce a pale rosin without greatly lowering the positive optical rotation of the rosin which comprises dissolving the rosin in a hydrocarbon solvent to a concentration of 20% by weight, adding to the solution a quantity of acid-treated bentonite in the ratio of four parts of bentonite to one part of rosin, agitating the mixture for a period of one hour at a temperature of approximately 2° C., and recovering the pale dextro-rotatory rosin from the mixture.

4. The process of refining dark colored wood rosin having a high specific positive optical rotation so as to produce a pale rosin without greatly lowering the positive optical rotation of the rosin which comprises dissolving the rosin in a hydrocarbon solvent to a concentration of 20% by weight, adding to the solution a quantity of acid-treated bentonite in the ratio of four parts of bentonite to one part of rosin, agitating the mixture for a period of one minute at a temperature of approximately 28° C., and recovering the pale dextro-rotatory rosin from the mixture.

5. The process of refining dark colored wood rosin having a high specific positive optical rotation so as to produce a pale rosin without greatly lowering the positive optical rotation of the rosin which comprises dissolving the rosin in a hydrocarbon solvent to a concentration of 20% by weight, adding to the solution a quantity of acid-treated bentonite in the ratio of three parts of bentonite to one part of rosin, agitating the mixture for a period of five minutes at a temperature of approximately 12° C., and recovering the pale dextro-rotatory rosin from the mixture.

6. The process of refining dark-colored rosin having a positive optical rotation so as to produce a pale rosin without materially disturbing the optical rotation, which comprises dissolving the rosin in a light petroleum distillate solvent, contacting the solution with acid-treated bentonite for a short period of time ranging from about one minute to about one hour and at a low temperature ranging from about 2° C. to about 28° C. in inverse proportion to the range of time aforesaid, and thereafter recovering the rosin from the solution.

7. The process of refining dark-colored rosin without materially disturbing its optical rotation, so as to produce a pale rosin, which comprises dissolving the rosin in a light petroleum distillate solvent, and contacting the solution with a quantity of acid-treated bentonite at least equal to the quantity of rosin, for a time ranging from about one minute to about one hour and at a temperature ranging from about 2° C. to about 33.5° C., in inverse proportion to the range of time aforesaid.

8. The process of purifying rosin, which comprises the steps of contacting a solution of said rosin with acid-treated bentonite and maintaining the solution at a temperature less than about 28° C. for a period of time proportionately less than about one hour as the order of temperatures range upwardly toward 28° C., whereby to produce a substantially decolorized rosin without materially disturbing the optical rotation of the rosin.

9. The process of purifying rosin, which comprises the steps of contacting a solution of said rosin with acid-treated bentonite and maintaining the contact for a time less than about one hour at a temperature proportionately less than about 28° C. as the order of time ranges upwardly towards one hour, whereby to produce a substantially decolorized rosin without materially disturbing the optical rotation of the rosin.

10. The process of treating rosin dissolved in a light petroleum distillate solvent with acid-treated bentonite in a ratio from one to four parts of said bentonite to one part of rosin at a temperature less than about 28° C. for a period of time proportionately less than about one hour as the order of temperatures range upwardly toward 28° C. whereby the specific optical rotation of the rosin is not materially disturbed.

11. The process of treating wood rosin dissolved in a light petroleum distillate solvent with acid-treated bentonite in a ratio of at least one part of bentonite to one part of rosin at a temperature less than about 28° C. for a period of time proportionately less than about one hour as the order of temperatures range upwardly toward 28° C., whereby the specific optical rotation of the rosin is not materially disturbed.

12. The process of treating dark colored rosin so as to produce a pale rosin without materially disturbing the optical rotation, which comprises dissolving the rosin in a light petroleum distillate solvent, agitating the solution with acid-treated bentonite for such a short period of time less than about one hour and at a temperature proportionately less than about 28° C. as the order of time ranges upwardly towards one hour, to substantially inhibit the formation of rosin acids having a negative optical rotation.

13. The process of refining dark colored rosin having a positive optical rotation so as to produce a pale rosin without materially disturbing the optical rotation, which comprises dissolving the rosin in a light petroleum distillate solvent, contacting the solution with acid-treated bentonite for a short period of time ranging from about one minute to about one hour at a temperature proportionately less than about 28° C. as the order of time ranges upwardly towards one hour, thereby producing a slurry, filtering and recovering the pale dextro-rotatory rosin from the filtrate by steam distillation.

14. The process of refining dark colored rosin having a high specific positive optical rotation so as to produce a pale rosin without greatly lowering the positive optical rotation of the rosin, which comprises dissolving the rosin in a light petroleum distillate solvent, adding to the solution a quantity of acid-treated bentonite at least equal to the quantity of rosin, agitating the mixture for a time less than about one hour and at a temperature proportionately less tahn about 28° C. as the order of time ranges upwardly towards one hour, and recovering the pale dextro-rotatory rosin from the mixture.

ROBERT E. PRICE.
ISMOND E. KNAPP.